United States Patent [19]

Röhm

[11] Patent Number: 4,586,859
[45] Date of Patent: May 6, 1986

[54] AUTOLOCKING HAMMER-DRILL CHUCK

[76] Inventor: Günter H. Röhm, Heinrich-Röhm-Str. 50, 7927 Sontheim, Fed. Rep. of Germany

[21] Appl. No.: 654,792

[22] Filed: Sep. 26, 1984

[30] Foreign Application Priority Data

Sep. 27, 1983 [DE] Fed. Rep. of Germany ... 8327665[U]

[51] Int. Cl.⁴ .............................................. B23B 31/12
[52] U.S. Cl. ..................................... 408/240; 279/116
[58] Field of Search ....................... 408/240, 239, 226; 279/60–64, 1 K, 66, 67, 71

[56] References Cited

U.S. PATENT DOCUMENTS 4,214,765 7/1980 Rhom ................................. 279/60 X
4,302,021 11/1981 Rhom ..................................... 279/60

FOREIGN PATENT DOCUMENTS 1366855 4/1978 United Kingdom .................. 279/60

Primary Examiner—Douglas D. Watts
Attorney, Agent, or Firm—Karl F. Ross; Herbert Dubno

[57] ABSTRACT

A hammer-drill chuck comprises a generally tubular chuck body centered on a chuck axis and having a central axially extending bit-receiving passage and a radially outwardly open chuck-key centering hole. A plurality of jaws radially but not angularly displaceable in the chuck body have inner ends engageable with the drill-bit shank in the passage. An adjustment ring connected to the jaws moves same radially synchronously and thereby centers the bit in the body by engagement of the inner ends with the shank. This ring is formed with axially backwardly directed teeth positioned axially forward of the centering hole such that when a chuck key is fitted into the centering hole its crown gear meshes with the ring teeth. A locking sleeve angularly nondisplaceable on the body carries at least one tooth axially engageable between the ring teeth. This sleeve is axially displaceable on the body between an axially forward locking position with the sleeve tooth engaged with the ring teeth and the sleeve positioned relative to the hole such that the key cannot be fitted to the chuck with the gear meshing with the ring teeth and an axially backward freeing position with the sleeve tooth out of engagement with the ring teeth and the sleeve positioned relative to the hole such that the key can be fitted to the chuck with the gear meshing with the ring teeth. A biasing spring is braced between the sleeve and the body for urging the sleeve axially forward into the locking position. Normally the angular-coupling formations are on the jaws.

9 Claims, 8 Drawing Figures

AUTOLOCKING HAMMER-DRILL CHUCK

FIELD OF THE INVENTION

The present invention relates to a drill chuck. More particularly this invention concerns a heavy-duty hammer-drill chuck.

BACKGROUND OF THE INVENTION

A standard hammer drill has a drive spindle that is rotated about a spindle axis and a hammer displaceable axially in the drive spindle. A chuck is carried on the spindle so as to rotate therewith, and holds a drill bit having a shaft having a radially outwardly open and at least generally axially extending groove. The chuck holds the drill bit so it is centered on the spindle axis, and the hammer is effective on the rear end of the drill bit. The bit is rotationally coupled to the chuck body, which as mentioned above is rotated, and is at least limitedly axially reciprocated by the hammer so that it can drill through masonry or the like.

Since at least limited axial reciprocation is necessary for the drill bit, it is necessary that the bit not be solidly axially coupled to the chuck, as then the hammering would have to reciprocate the chuck also. Accordingly, the system of my copending U.S. patent application Ser. No. 591,975 filed March 21, 1984 describes a chuck used with a hammer drill having a drive spindle rotatable about a spindle axis and a hammer displaceable axially in the drive spindle, and with a drill bit having a shaft extending along a shaft axis and having a radially outwardly open and at least generally axially extending groove. The chuck has a generally tubular chuck body centered on a chuck axis and having a central axially extending passage. This body is normally carried on the spindle and receives the shaft of the drill bit in its passage with the spindle, shaft, and chuck axes all coaxial. The hammer projects axially forward into the passage and is engageable therein with the bit. A plurality of jaws radially but not angularly displaceable in the chuck body have inner ends engageable with the drill-bit shaft and in turn provided with formations complementarily engageable in the groove thereof. An actuator is connected to the jaws for moving same radially synchronously and thereby centering the bit in the body by engagement of the inner ends with the shaft and for engaging the formations in the grooves for rotationally linking the body and bit while permitting limited relative axial movement Such an arrangement is somewhat complex. In addition it is not impossible for the jaws to move out somewhat during prolonged hammer drilling, so that the bit will wobble about and make a sloppy hole.

OBJECTS OF THE INVENTION

It is therefore an object of the present invention to provide an improved hammer-drill chuck.

Another object is the provision of such a hammer-drill chuck which overcomes the above-given disadvantages, that is which is not able to loosen during hammer drilling, but which is easy to use.

SUMMARY OF THE INVENTION

A hammer drill has a drive spindle rotatable about a spindle axis and a hammer displaceable axially in the drive spindle. A drill bit has a shank extending along a shank axis and having a radially outwardly open and at least generally axially extending groove. A chuck key has a centering tip and a gear crown therearound. A chuck comprises a generally tubular chuck body centered on a chuck axis and having a central axially extending passage and a radially outwardly open centering hole. This body normally is carried on the spindle and receives the shank of the drill bit in its passage with the spindle, shank, and chuck axes all coaxial. The hammer projects axially forward into the passage and is engageable therein with the bit. A plurality of jaws radially but not angularly displaceable in the chuck body have inner ends engageable with the drill-bit shank in the passage. Formations angularly nondisplaceable on the chuck body and complementarily engageable in the groove of the drill-bit shank can angularly couple the chuck body and drill bit. An adjustment ring connected to the jaws moves same radially synchronously and thereby centers the bit in the body by engagement of the inner ends with the shank. This ring is formed with axially backwardly directed teeth positioned axially forward of the centering hole such that when the chuck key is fitted into the centering hole its crown gear meshes with the ring teeth. A locking sleeve axially but not angularly displaceable on the body carries at least one tooth axially engageable between the ring teeth. This sleeve is axially displaceable on the body between an axially forward locking position with the sleeve tooth engaged with the ring teeth and the sleeve positioned relative to the hole such that the key cannot be fitted to the chuck with the gear meshing with the ring teeth and an axially backward freeing position with the sleeve tooth out of engagement with the ring teeth and the sleeve positioned relative to the hole such that the key can be fitted to the chuck with the gear meshing with the ring teeth. A biasing spring is braced between the sleeve and the body for urging the sleeve axially forward into the locking position. Normally the angular-coupling formations are on the jaws.

According to another feature of this invention the sleeve is formed with a notch having an edge closely juxtaposed with the centering hole in the locking position and spaced sufficiently axially backward from the centering hole in the freeing position that it clears the gear of the key fitted to the hole. This edge is located such that it bears on the crown gear of the key fitted to the hole and thereby holds the sleeve in the freeing position.

It is possible for the sleeve to have an array of teeth substantially complementary to the teeth of the ring. This is an extremely simple structure with the only disadvantage that the sleeve and ring can only lock together in a number of positions equal to the number of ring teeth.

For finer settings the sleeve is provided with a plurality of axially displaceable and angularly spaced detents each having an axial forward end forming one such tooth and each provided with a spring urging it axially forward, the angular spacing between the detents being nonuniform. The detents are spaced from one other by an angle equal to a whole-number multiple of the angle between adjacent ring teeth plus or minus this angle divided by the number of detents.

DESCRIPTION OF THE DRAWING

The above and other features and advantages will become more readily apparent from the following, reference being made to the accompanying drawing in which.

SPECIFIC DESCRIPTION

Figure 4:
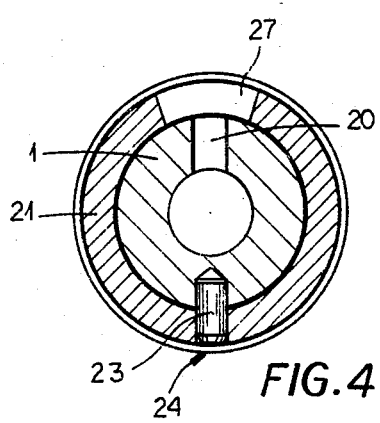
FIG. 4 is a cross section taken along line IV—IV of FIG. 3.
Figure 2:
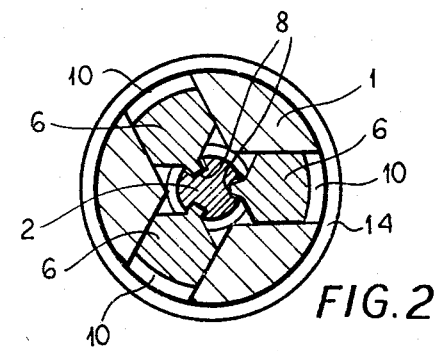
FIG. 2 is a cross section taken along line II—II of FIG. 1.

As seen in FIGS. 1 through 4 a drill chuck has a body 1 centered on an axis 7 and mounted on a spindle 31 that rotates about this axis 7. This body 1 is basically tubular, having at its rear end a threaded bore 3 in which the spindle 31, an intermediate portion 11 of smaller diameter in which a hammer rod 5 is loosely received, and a large-diameter front portion 4 adapted to receive the cylindrical and axially grooved shank of a hammer-drill bit 2 formed with three axially extending and radially outwardly open grooves 8.

Three angularly equispaced jaws 6 are slidable in respective guides 10 for movement therein along respective axes lying in a plane perpendicular to the axis 7 and angularly equispaced about the axis 7. Each jaw 6 has a axially backwardly directed face formed with an annular array of radial teeth 26 and a radially inner tip 9 adapted to engage in the respective groove 8.

An adjustment ring 13 is formed on its axially forwardly directed face with a spiral thread formation 15 meshing with the teeth 26 and is rotatable on the chuck body 1 about the axis 7. The pitch of the spiral 15 and of the teeth 26 and the position of the teeth 26 of one jaw 6 relative to the others are all such that the tips 9 always define a cylinder centered on the axis 7. This ring 13 is of two parts and is held together by a milled ring 14.

The axially backward edge of the ring 13 is formed with teeth 16 that can mesh with the gear crown 18 of a standard gear-type chuck key 17. Holes 20 in the chuck body 1 are provided to receive a centering tip 19 of this key 17. When the tip 19 is inserted in the hole 20 so that the teeth 16 mesh with the crown gear 18, rotation of the key 17 about the pin 19 will rotate the ring 13 about the axis 7 and thereby move the jaws 6 in unison inward or outward, depending on rotation direction.

According to this invention a locking sleeve 21 fits around and is axially slidable on the body 1. It is formed with an axially extending slot 24 into which projects a guide pin 23 projecting axially from the body 1. Thus this sleeve 21 cannot rotate about the axis 7 on the body 1, but can move freely axially thereon through a stroke equal to the axial length of the slot 24 minus the diameter of the pin 23. The axially forward edge of this sleeve 21 is formed with an array of radially extending teeth identical to the teeth 13 and capable of meshing therewith.

A coil-type compression spring 25 centered on the axis 7 bears axially backward on a snap ring 32 seated in the body 1 and axially forward on a backwardly facing shoulder of the sleeve 1 to urge this sleeve 21 axially forward into the locking position with the teeth 22 and 13 in mesh. In this position, which is illustrated on the left-hand side of FIG. 1, the ring 14 is locked on the body 1 against rotation, thereby locking the jaws 6 in whatever position they were set in.

Figure 3:
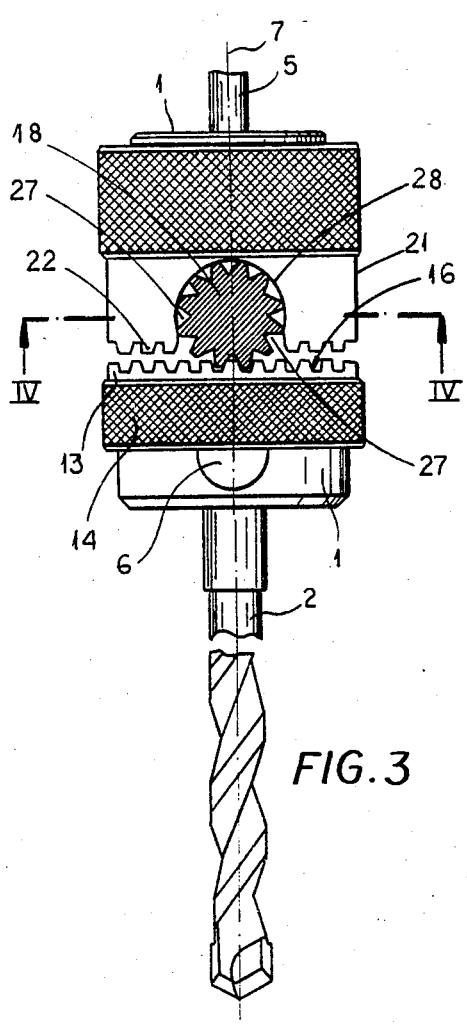
Fig. 3 is a longitudinal section taken along line III—III of FIG. 1.
Figure 1:
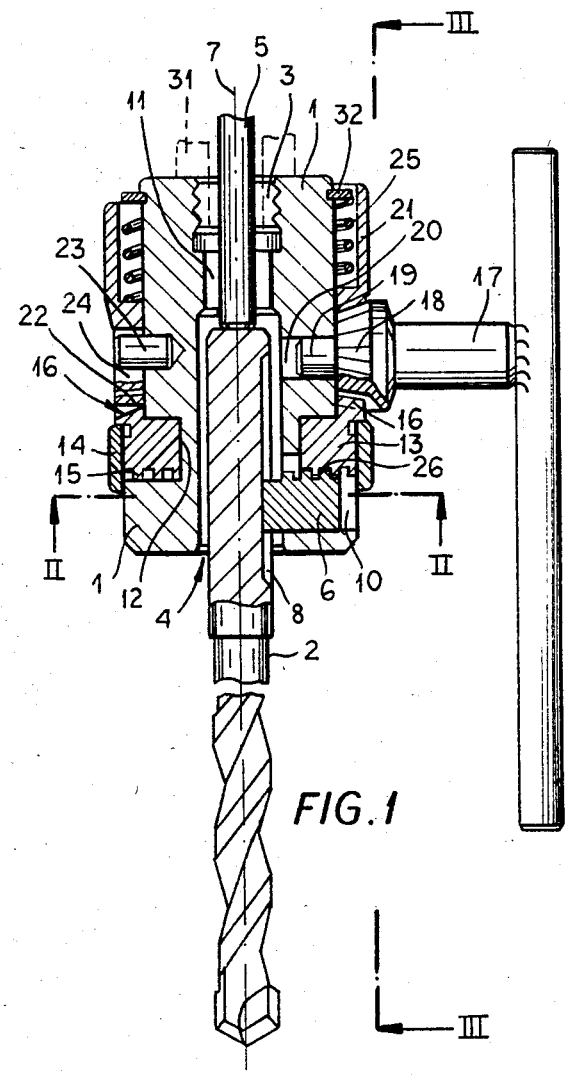
FIG. 1 is an axial section through a chuck assembly according to this invention.
Figure 8:
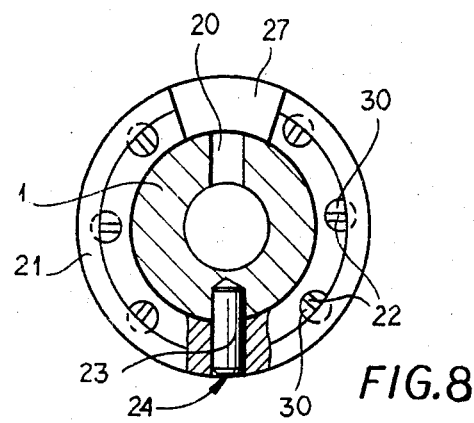
FIG. 8 is a cross section taken along line VIII—VIII of FIG. 7.
Figure 6:
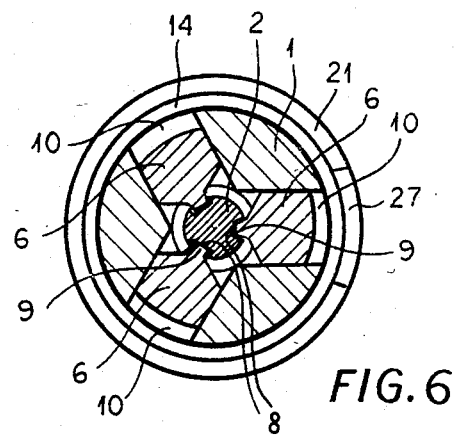
Fig. 6 is a cross section taken along line VI—VI of FIG. 5.
Figure 7:
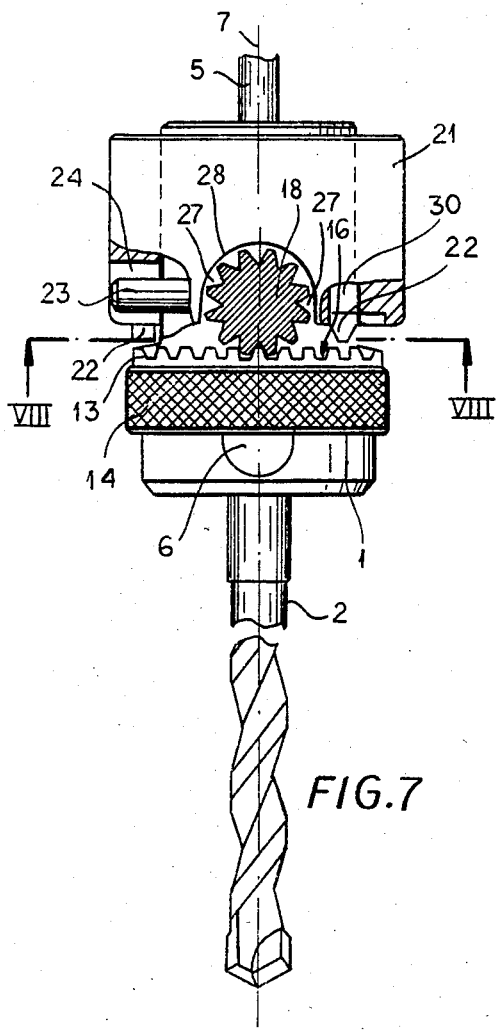
FIG. 7 is a longitudinal section taken along line VII—VII of FIG. 5.
Figure 5:
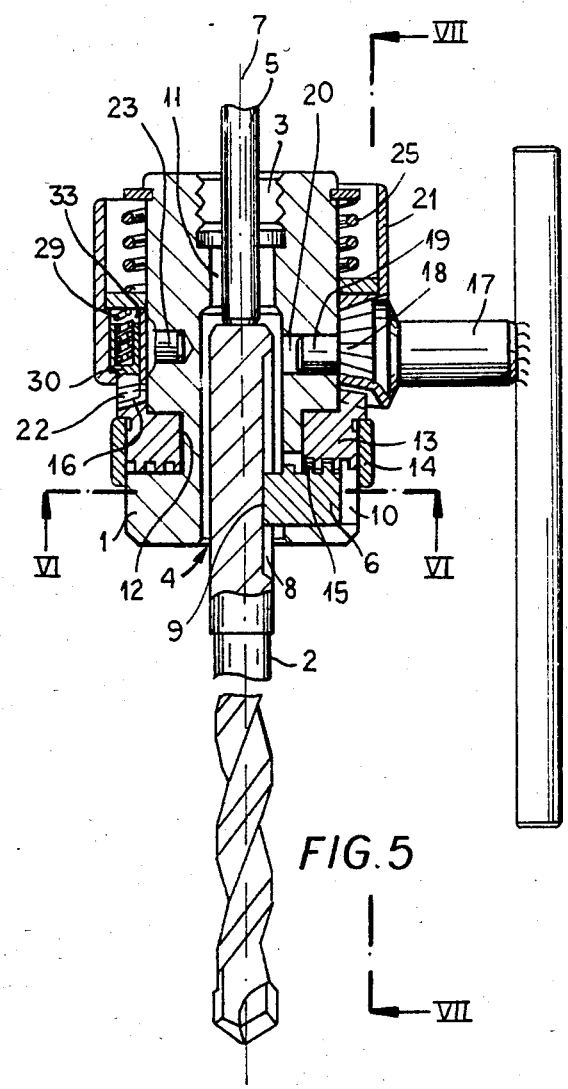
FIG. 5 is an axial section through another chuck assembly according to this invention.

The sleeve 21 is also formed with an axially forwardly open cutout 27 having a semicircular edge 28 of the same radius of curvature as the crown gear 18 and centered on the axis of the centering-pin hole 20 when the sleeve 21 is in the retracted unlocking position shown to the right in FIG. 1 and in FIG. 3. In this position the teeth 13 and 22 do not engage each other so the ring 14 can be rotated to adjust the jaws 6. When the sleeve 21 is advanced into the locking position, however, it is impossible to fit the key 17 to the chuck, as the notch 27 is in a position partially blocking the space needed adjacent the hole 20 for the crown gear 18.

Thus when the chuck is to be tightened or loosened the user must first pull back the ring 21 against the force of its spring 25, disengaging the teeth 13 and 22 from each other. Then the key 17 can be inserted so that the ring 13 can be rotated to move the jaws 6 in or out. Once the key 17 is inserted it prevents the locking sleeve 21 from moving axially forward into the locking position. This sleeve 21 therefore need merely be held back until the key 17 is in place.

The arrangement of FIGS. 5 through 8 is used identically, and the same reference numerals as in FIGS. 1 through 4 are used for the same structure. Here there are only six teeth 22 and they are carried on respective detent pins 30 axially displaceable in axially extending guide holes 33 formed in the sleeve 21. Springs 29 urge these detent pins 30 axially forward.

If the six detents 30 were angularly equispaced about the axis 7 they would all jointly engage fully between two teeth 13 at the same time. By using nonequiangular spacing it is possible to obtain a finer ratcheting with at any one time only one tooth 22 fully engaged between two teeth 13. More specifically when n = number of detents,
K = a whole number, and
b = angle between adjacent teeth 13, the angle a between the detents is determined by:

$$a = Kb + b/n.$$

Thus for an arrangement of the type shown with six detents (n=3), and thirty teeth 13 (b=12°), the formula becomes:

$$a = K(12°) + 2°.$$

Since the one side of the sleeve 21 is taken up by the slot 24 and the opposite side by the notch 27, the six detents 30 are mounted in two groups of three on either side of an axial plane bisecting the slot 24 and notch 27. The nonequiangular spacing in this arrangement therefore defines a total of 180 different stable positions for the ring on the chuck body, one capable of maintaining virtually any position, as the mechanical advantage between the spiral thread 26 and the teeth 15 is very large. If two teeth 22 are to be engaged at any time, to reduce forces, the term n drops to n/2, an arrangement that still leaves a great many stable positions.

I claim:
1. In combination with
   a hammer drill having a drive spindle rotatable about a spindle axis and a hammer displaceable axially in the drive spindle, a drill bit having a shank extending along a shank axis and having a radially outwardly open and at least generally axially extending groove, and a chuck key having a centering tip and a gear crown therearound, a chuck comprising:

a generally tubular chuck body centered on a chuck axis and having a central axially extending passage and a radially outwardly open centering hole, the body normally being carried on the spindle and receiving the shank of the drill bit in its passage with the spindle, shank, and chuck axes all coaxial, the hammer projecting axially forward into the passage and being engageable therein with the bit;

a plurality of jaws radially but not angularly displaceable in the chuck body and having inner ends engageable with the drill-bit shank in the passage;

formations angularly nondisplaceable on the chuck body and complementarily engageable in the groove of the drill-bit shank, whereby the formations can angularly couple the chuck body and drill bit;

means including an adjustment ring connected to the jaws for moving same radially synchronously and thereby centering the bit in the body by engagement of the inner ends with the shank, the ring being formed with axially backwardly directed teeth positioned axially forward of the centering hole such that when the chuck key is fitted into the centering hole its crown gear meshes with the ring teeth;

a locking sleeve axially but not angularly displaceable on the body and carrying at least one tooth axially engageable between the ring teeth, the sleeve being axially displaceable on the body between an axially forward locking position with the sleeve tooth engaged with the ring teeth and the sleeve positioned relative to the hole such that the key cannot be fitted to the chuck with the gear meshing with the ring teeth and an axially backward freeing position with the sleeve tooth out of engagement with the ring teeth and the sleeve positioned relative to the hole such that the key can be fitted to the chuck with the gear meshing with the ring teeth; and biasing means braced between the sleeve and the body for urging the sleeve axially forward into the locking position.

2. The hammer-drill chuck assembly defined in claim 1 wherein the formations are on the jaws.

3. The hammer-drill chuck assembly defined in claim 1 wherein the sleeve is formed with a notch having an edge closely juxtaposed with the centering hole in the locking position and spaced sufficiently axially backward from the centering hole in the freeing position that it clears the gear of the key fitted to the hole.

4. The hammer-drill chuck assembly defined in claim 3 wherein the edge is located such that it bears on the crown gear of the key fitted to the hole and thereby holds the sleeve in the freeing position.

5. The hammer-drill chuck assembly defined in claim 1 wherein the sleeve has an array of teeth substantially complementary to the teeth of the ring.

6. The hammer-drill chuck assembly defined in claim 1 wherein the sleeve is provided with a plurality of axially displaceable and angularly spaced detents each having an axial forward end forming one such tooth and each provided with a spring urging it axially forward, the angular spacing between the detents being nonuniform.

7. The hammer-drill chuck assembly defined in claim 6 wherein the ring teeth are spaced apart by a predetermined angle and the detents are spaced from one other by an angle equal to a whole-number multiple of the ring-teeth angle plus or minus this angle divided by the number of detents.

8. The hammer-drill chuck assembly defined in claim 1 wherein the chuck body is provided with a radially outwardly projecting pin and the sleeve is formed with an axially extending slot into which this pin projects, whereby the pin prevents the sleeve from rotating on the body.

9. The hammer-drill chuck assembly defined in claim 1 wherein the ring has an axial front face formed with a spiral formation and the jaws have teeth engaged in the formation, whereby rotation of the ring radially displaces the jaws.

* * * * *